United States Patent [19]

Martin

[11] 4,393,543
[45] Jul. 19, 1983

[54] SHRIMP PROCESSING AND HANDLING APPARATUS

[76] Inventor: Roger C. Martin, 1392 Lenora Dr., Merritt Island, Fla. 32952

[21] Appl. No.: 272,901

[22] Filed: Jun. 12, 1981

[51] Int. Cl.$^3$ ............................................. A22C 29/00
[52] U.S. Cl. ................................................ 17/72
[58] Field of Search .................... 17/71, 72, 73, 48, 24

[56] References Cited

U.S. PATENT DOCUMENTS 3,867,740  2/1975  Lapine et al. ........................ 17/72
4,008,508  2/1977  Lapine et al. .

FOREIGN PATENT DOCUMENTS

157400  12/1952  Australia ............................. 17/71

*Primary Examiner*—Willie G. Abercrombie
*Attorney, Agent, or Firm*—Roger L. Martin

[57] ABSTRACT

An eviscerating apparatus uses a belt conveyor for transporting preoriented shrimp through an uncurling mechanism, a cutting mechanism and a washing device for removing the digestive tract from the shrimp body parts. The curled body parts are preoriented through use of rotating rollers which are equipped with grooves that provide a ledge for flipping the shrimp onto their backs in a channel formed by the rollers. As thus oriented, the shrimp are successively fed to a trough formed by the belt of the conveyor. Shrimp are cradled on their backs in the trough and pass beneath a spring loaded shoe that straightens the curled shrimp body parts out against the belt of the conveyor. The shrimp are then cut to provide an incision which extends from the ventral side to the digestive tract at the dorsal side and upon leaving the cutting mechanism, a narrow rib passes into the incision so as to maintain separation of the body sections as water is projected into the incision from the lower extremity of the rib so as to flush the digestive tract from the body part.

19 Claims, 17 Drawing Figures

SHRIMP PROCESSING AND HANDLING APPARATUS

BACKGROUND OF THE INVENTION

1. Field of Invention

The invention relates to the handling of shell bearing shrimp body parts and more particularly to apparatuses for orienting the shrimp body parts and for handling and eviscerating such shrimp body parts.

2. Description of Prior Art

The evisceration procedures for removing the digestive tracts of uncooked and shell bearing shrimp normally involve the cutting of the shell longitudinally along the dorsal or back side of the shrimp body part. Typical of the procedures and apparatuses involved in processing of shrimp in this manner are those shown in U.S. Pat. Nos. 2,626,701; 2,960,719; and 2,971,215. Rock shrimp have shells which are much harder than most shrimp and evisceration procedures for processing this type of shrimp have involved a cutting of the shrimp along the under or ventral side as depicted in U.S. Pat. No. 3,867,740.

Most of the processing procedures contemplate a deheading and removal of the legs from the shrimp body parts before the shell bearing body part is processed for the removal of the digestive tract. Furthermore, all of the evisceration procedures known to the applicant involve a special orientation of the shrimp body part in either a tail or head leading position on the carrier for transporting the body part through the cutting mechanism used in the eviscerating apparatus. The orientation of the shrimp body part on the carrier is usually done manually since most of the carrier systems employed in the transportation of the shrimp body parts through the cutting and washing mechanisms of the apparatuses are not suited to the use of automatic delivery systems.

One of the problems which is encountered in the evisceration procedures is that of coping with the curled body part of the uncooked shrimp. In those cases where the body part traverses a linear path through the cutting mechanism, the curled body part is straightened before passing through the cutting mechanism whereas in other apparatuses, the body part is caused to traverse an arcuate path through the cutting mechanism so that the procedure for uncurling or straightening the body part may be avoided. Apparatuses that convey the body part along an arcuate path are shown in U.S. Pat. Nos. 2,960,719 and 2,971,215; whereas those involving a linear path of movement through the cutting mechanism are exemplified by the apparatuses shown in U.S. Pat. Nos. 2,626,701 and 3,867,740.

SUMMARY OF THE INVENTION

The eviscerating apparatus in accord with certain aspects of the invention contemplates a conveyor for carrying the uncooked body parts through the cutting mechanism and along a linear path of movement. It features an uncurling mechanism for straightening the curled body parts and to which the curled body part may be delivered in either a tail or a head leading position and thereafter also passed through the cutting and washing mechanisms without further orientation of the body part. The apparatus also features in accord with other aspects of the invention a washing mechanism that avoids the need for flattening the body parts in order to remove the digestive tracts.

One aspect of the invention has to do with a mechanism for handling the shrimp body parts as they are randomly received by the eviscerating apparatus and for appropriately orienting and thereafter successively delivering the curled body parts to the processing section of the apparatus. Here, the inventor uses a pair of inclined, elongated and closely spaced apart cylindrical rolls for orienting and delivering the curled body parts to the processing section of the eviscerating apparatus. The rolls, as will be subsequently seen, are adapted and arranged by virtue of certain grooves in the rolls to flip the shrimp body parts onto their backs as the body parts traverse a channel formed by the rolls from the feed end to the discharge end of the orienting mechanism. Procedurally, the shrimp body parts are supported in an inclined channel that is formed by the rolls and the rolls are driven in opposite directions which tend to urge the body parts upwardly in the trough formation and also facilitate their movement toward the discharge end of the trough. At least one of the rolls has a cylindrical surface which is interrupted by an elongated groove which is so-shaped that the roll surface at the trailing side of the groove causes the shrimp body parts which are oriented with the ventral sides facing downwardly in the trough to flip over onto a resting position on their backs, and all without flipping those which are already resting on their dorsal sides. The roll arrangement facilitates the reception of randomly arranged body parts at the feed end of the channel, their orientation into positions at which they are restingly supported on their dorsal sides in the channel and the subsequent successive delivery of the oriented shrimp body parts to the processing section of the apparatus.

In the processing section of the eviscerating apparatus, the curled shrimp body parts are received from the orienting mechanism and are cradled on their backs in a moving trough that is formed by a flexible conveyor belt of the apparatus. At the receiving section in the processing section, the belt is shaped to provide the trough formation and which serves to retain the oriented positions in which the shrimp body parts are received from the orienting mechanism. At the uncurling mechanism the thus oriented and belt supported curled body parts are urged into straightened positions by forces that are exerted against the cradled body parts by means of a compression plate or shoe that overlies the path of belt movement. The procedures used for supporting and uncurling the shrimp body parts facilitates the automatic delivery of the shrimp body parts to the cutting mechanism in either a tail or head leading position. This, of course, avoids the need for hand orientation of all of the body parts in one particular direction before they are straightened out and thereafter subjected to the cutting procedures.

Yet other aspects of the invention have to do with the washing of the shrimp. As previously indicated, rock shrimp are cut along the ventral side of the body part. This type of cut or incision almost completely severs the body part into two sections which are mainly held together by the shell at the dorsal side of the body part after the incision is made. Since the digestive tract area is located along the dorsal side of the body part, it is sometimes difficult to remove the tract without the use of brushes or a complete flattening of the nearly disected body part in order to expose the digestive tract to the washing action of water jets. In accord with this aspect of the invention, the digestive tract is flushed from the body part as the sections of the body part are held apart by a narrow rib that is received in the incision and through which the wash water is projected into the base of the incision to flush out the digestive tract but without the need for flattening the disected body part. The procedures followed not only eliminate the need for brushing and flattening the body part but facilitate a more compact and efficient eviscerating apparatus design as well as a product which is more intact appearing than derived from apparatuses using the washing procedures heretofore employed.

DESCRIPTION OF THE DRAWINGS

The novel features which are believed to be characteristic of this invention are set forth with particularity in the appended claims. The invention, itself, however, both as to its organization and method of operation, together with further objects and advantages thereof may best be understood by reference to the following description taken in connection with the accompanying drawings, wherein:

DESCRIPTION OF PREFERRED EMBODIMENT

Reference is now made to the drawings and wherein an eviscerating apparatus for removing the digestive tracts from rock shrimp body parts is generally designated at 10. It includes a product handling and orienting section 11 which is designed to automatically orient and feed the shrimp body parts successively to a processing section 12. In the processing section 12, the body parts are straightened, cut and then subjected to the removal of their digestive tracts. After processing, the body parts are delivered to a suitable receptacle 13 from which they are delivered to suitable packaging or other processing facilities.

Figure 1:
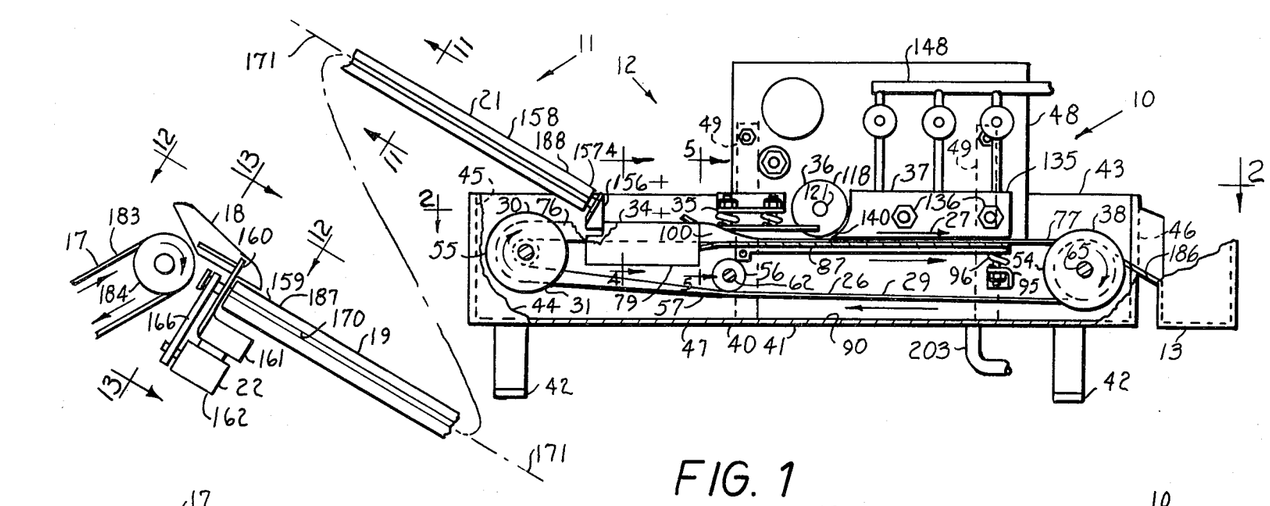
FIG. 1 is a side elevational view of an apparatus embodying the principles of the various aspects of the invention, certain parts being broken away to facilitate the exposure and arrangement of other parts of the apparatus.

The product orienting section 11 includes a belt conveyor 17 that receives and elevates the shrimp body parts from interum storage facilities (not shown) and discharges the body parts at its upper end into a chute 18. From here, the body parts fall in a random fashion onto a pair of rolls 20 and 21 of a mechanism 19 that is provided for orienting the body parts and successively discharging them into the product processing section 12. The rolls 20 and 21 are rotatably driven in the apparatus 10 by a drive mechanism 22.

The processing section 12 includes a belt conveyor 26 for receiving and carrying the body parts that are delivered from the orienting section 11 along a linear path 27 through the section 12. The conveyor has a mechanism 28 for driving the flat belt 29 and at the feed end 30 of the conveyor 26, the section 12 is equipped with a belt shaping device 31. Device 31 serves as a means for shaping the top flight 32 of the belt 29 into a narrow trough 33 for receiving and supporting the body parts at the receiving station 34 of the section 12. Adjacent the receiving station 34, section 12 is equipped with an uncurling device 35 which serves as a means for straightening the curled body parts delivered from section 11. From the uncurling device 35, the straightened body parts pass through a cutting mechanism 36 which provides a means for cutting incisions in the straightened body parts preparatory to the removal of the digestive tracts. From mechanism 36 the cut body parts pass through a device 37 for removing the digestive tracts from the body parts through the incisions therein. The digestive tracts free of the body parts derived from the tract removing device 37 are passed to the product receptacle 13 at the discharge end 38 of the conveyor 26.

The principal components of the processing section 12 are mounted on a framework that is designated at 40. This framework 40 includes an elongated, narrow, box-like tray forming structure 41 that is supported at its opposite ends on a pair of underlying brackets 42. The structure 41 not only serves as a mounting place for the principal components of section 12 but also serves as a sump that underlies the processing area to catch and contain debris and wash water derived during the processing steps.

The tray structure 41 has vertically oriented opposite side walls 43 and 44, vertically oriented opposite end walls 45 and 46, and a bottom wall 47. These walls 43-47 are secured together to provide the open top, water tight tray structure 41 used in mounting the components of the processing section and for collecting the debris and wash water resulting from the operation of the apparatus. The left side wall 43 of framework 40 has a vertically oriented metal mounting plate 48 that rises above the tray structure 41 and is used for mounting certain of the apparatus components, as will be subsequently seen. This plate 48 is fixed to the left side wall 43 by means of a pair of upright extending and horizontally spaced apart parallel angle members 49 that are suitably fixed to the left side wall 43 and mounting plate 48 by means of bolts 50.

The belt conveyor 26 is designed to receive and carry the shrimp body parts along the linear path 27 through the processing section 12. It includes a cylindrical drive roll 54 that is located at the discharge end 38 of the conveyor 26, an arcuately grooved idler roll 55 that is mounted at the feed end 30 of the conveyor 26, and a cylindrical idler roll 56 that is located between the drive and grooved rolls 54 and 55 and in contact with the lower flight 57 of the endless flat conveyor belt 29. Belt 29 is trained over the rolls 54, 55 and 56, and idler roll 56 is adjustably mounted to facilitate an adjustment of the tension in the conveyor belt 29 when the need arises.

The grooved roll 55 is fixed to a shaft 59 that is appropriately journaled at its opposite ends in a pair of bearings 60 that are mounted in the opposite side walls 43 and 44 of the tray 41. Idler roll 56 is similarly fixed to a transverse shaft 62 which is also journaled at its opposite ends in appropriate bearings 63 that are mounted in the opposite side walls 43 and 44. The bearings 63 for shaft 62 are adjustably mounted in the side walls 43 and 44 to facilitate appropriate movement of the roll 56 to adjust the tension in the conveyor belt 29. The drive roll 54 is fixed to a shaft 65 that is journaled for rotational movement at its opposite ends in a pair of bearings 66 which are also mounted in the opposite side walls 43 and 44. The drive mechanism 28 for the conveyor belt 26 is mounted at the left side wall 43 of tray 41. Here the shaft 65 for drive roll 54 is fixed to a sheave 67 that is drivingly connected to a belt component 68 of mechanism 28. Mechanism 28 is provided to continuously drive the conveyor belt 29 and includes an electric motor 69 which is supported on a bracket 70 that is fixed to the left side wall 43 of tray 41. Motor 69 has a sheave 71 that is mounted on the motor drive shaft 72. The belt component 68 is trained over and drivingly interconnects the two sheaves 65 and 72 so as to drivingly connect the electric motor 69 to the conveyor belt 29 and continuously drive it in the direction indicated by the arrows seen in FIG. 1.

The top flight 32 of the belt 29 extends along the linear path 27 to support the body parts delivered to the processing section 12 on their backs or dorsal sides as they traverse the paths. The receiving station 34 is located at the receiving end 76 of the linear path 27 and from the receiving station 34 to the discharge end 77 of the top flight, the body parts are supported on the top flight 32 of the flexible belt 29.

Figure 4:
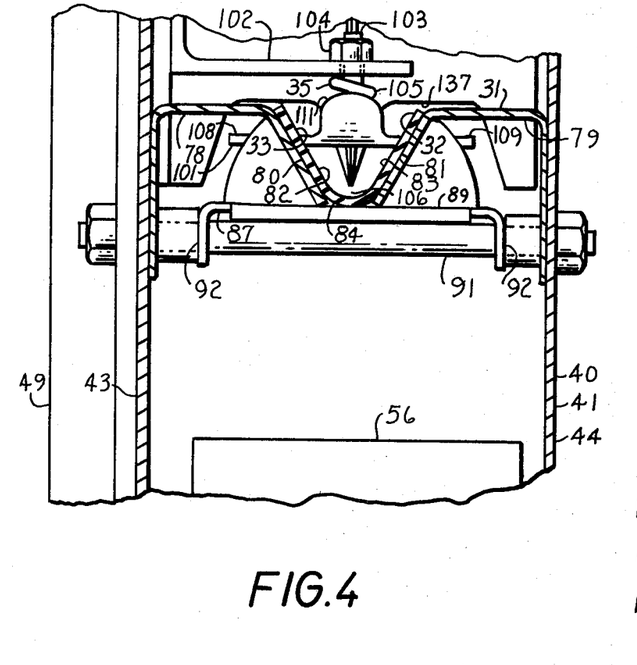
FIG. 4 is a transverse vertical sectional view through the receiving station of the processing section and as taken generally along the Lines 4—4 of FIG. 1.
Figure 5:
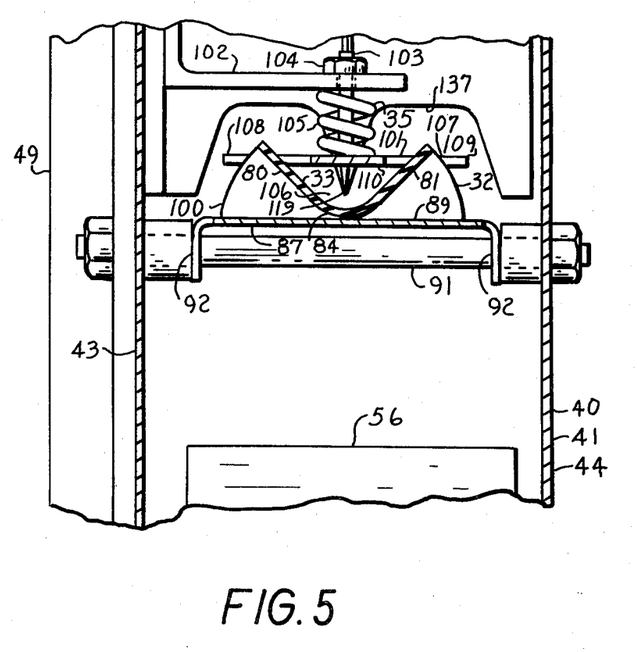
FIG. 5 is a transverse vertical section view at the entranceway to the uncurling mechanism and as taken generally along the Lines 5—5 of FIG. 1.
Figure 6:
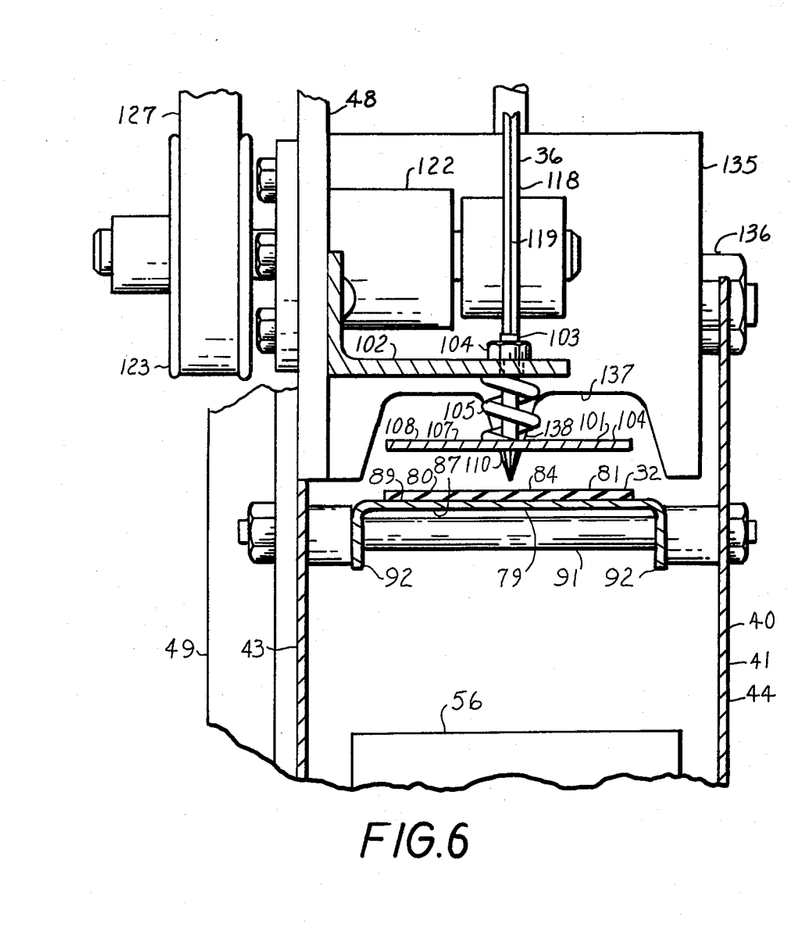
FIG. 6 is a transverse vertical sectional view through the uncurling mechanism as taken generally along the Lines 6—6 of FIG. 3.

The structure at the receiving station is best illustrated by reference to FIGS. 4 and 5. Here, at the receiving station, the top flight 32 is supported as the belt 29 is payed off the grooved idler roll 55 by a pair of rigid metal elements 78 and 79. These elements 78 and 79 support the belt flight 32 along its opposite side marginal portions 80 and 81 and in a manner such that the marginal portions are above the center portion 84 of the belt flight. These elements 78 and 79 are fixed to the respective side walls 43 and 44 of the tray structure 41. Each of the elements has an inwardly declining surface 82 and 83 that underlies the adjacent side marginal portions 80 and 81 of the upper flight 32 of belt 29 at the receiving station 34. The surface portions 82 and 83 support the belt flight 32, as it comes off the grooved roll 55 and traverses the receiving station 34, in a more or less U-shaped cross sectional configuration that provides the trough 33. The device 31 for shaping the top flight of the flat flexible belt 29 into the narrow trough 33 includes the grooved roll 55 and the support elements 78 and 79. The trough 33 is arranged to receive the oriented product from the orienting section 11 and to deliver the oriented product to the uncurling mechanism 35.

The upper flight 32 of the conveyor belt 29 is supported between the shaping device 31 and the discharge end 77 of the flight 32 by an elongated narrow flight and horizontally arranged bearing plate that is designated at 87. Plate 87 has a flat upwardly facing belt bearing surface 89 that underlies the belt flight 32 between the shaping device 31 and the discharge end 77 of flight 32. The plate 87 is also provided with depending opposite side edge 88 which facilitate the discharge of debris and wash water from the belt flight 32 and into the sump 90 that is provided at the bottom of the tray 41.

Adjacent to the belt support elements 78 and 79 at the receiving station 34, the bearing plate 87 is pivotally mounted on the tray structure 41 by a pivot pin 91 that is supported at its opposite ends in the side walls 43 and 44. Pin 91 passes through a pair of side ears 92 that are provided at the underside of the bearing plate 87 (FIG. 4). At the discharge end 77 of flight 32 and at the other end of the bearing plate 87, the plate 87 is spring loaded to yieldably resist downward pivotal movement. Here the plate 87 is fixed to a depending pin 93 that projects through and is axially movable in an appropriate opening (now shown) in a bracket 95. Bracket 95 is fixed to the left side wall 43 of tray 41 and between the underside of the bearing plate 87 and the upper surface of the bracket 95, pin 93 is surrounded by a coiled compression spring 96 that resists pivotal movement of the bearing plate in a downward direction but which nevertheless yields to downward forces as the needs arise.

The uncurling device 35 is located at the discharge end 100 of the trough 33 and includes the belt supporting plate 87 which underlies the belt flight 32. The device 35 also includes a spring loaded and horizontally arranged pressure plate or shoe 101 that overlies the bearing plate 87 and also overlies the upper flight 32 of the belt 29 for forcefully pressing the body parts against the center portion 84 of the top flight 32. The shoe 101 is suspended from an angle-type bracket 102 by means of a pair of pins 103. Bracket 102 is fixed to side wall 43 of tray 41 and the pins 103 are fixed to the shoe 101 at their lower ends. These pins 103 extend upwardly from the shoe through appropriate openings in bracket 102, the openings being provided to facilitate axial movement of the pins therein and hence movement of the shoe relative to the bracket. The pins 103 are retained on the bracket 102 by nuts 104 that threadingly engage the pins and are appropriately adjustable to facilitate vertical movement and adjustment of the shoe with respect to the top flight of the belt 29. Each pin carries a coiled compression spring 105 between the bracket 102 and the shoe 101. These springs 105 constantly urge the shoe 101 downwardly against the shrimp body part as it passes through the space 106 between the shoe 101 and the top flight 32 of the belt 29 and further serves to constantly bias the shoe 101 into its general operating position 107.

Figure 2:
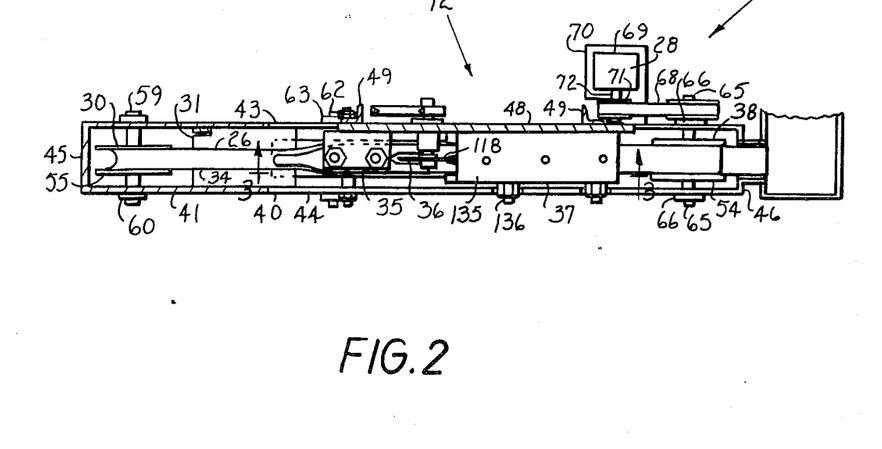
FIG. 2 is a horizontal sectional view of the processing section of the apparatus shown in FIG. 1 and as generally seen along the Lines 2—2 therein.
Figure 3:
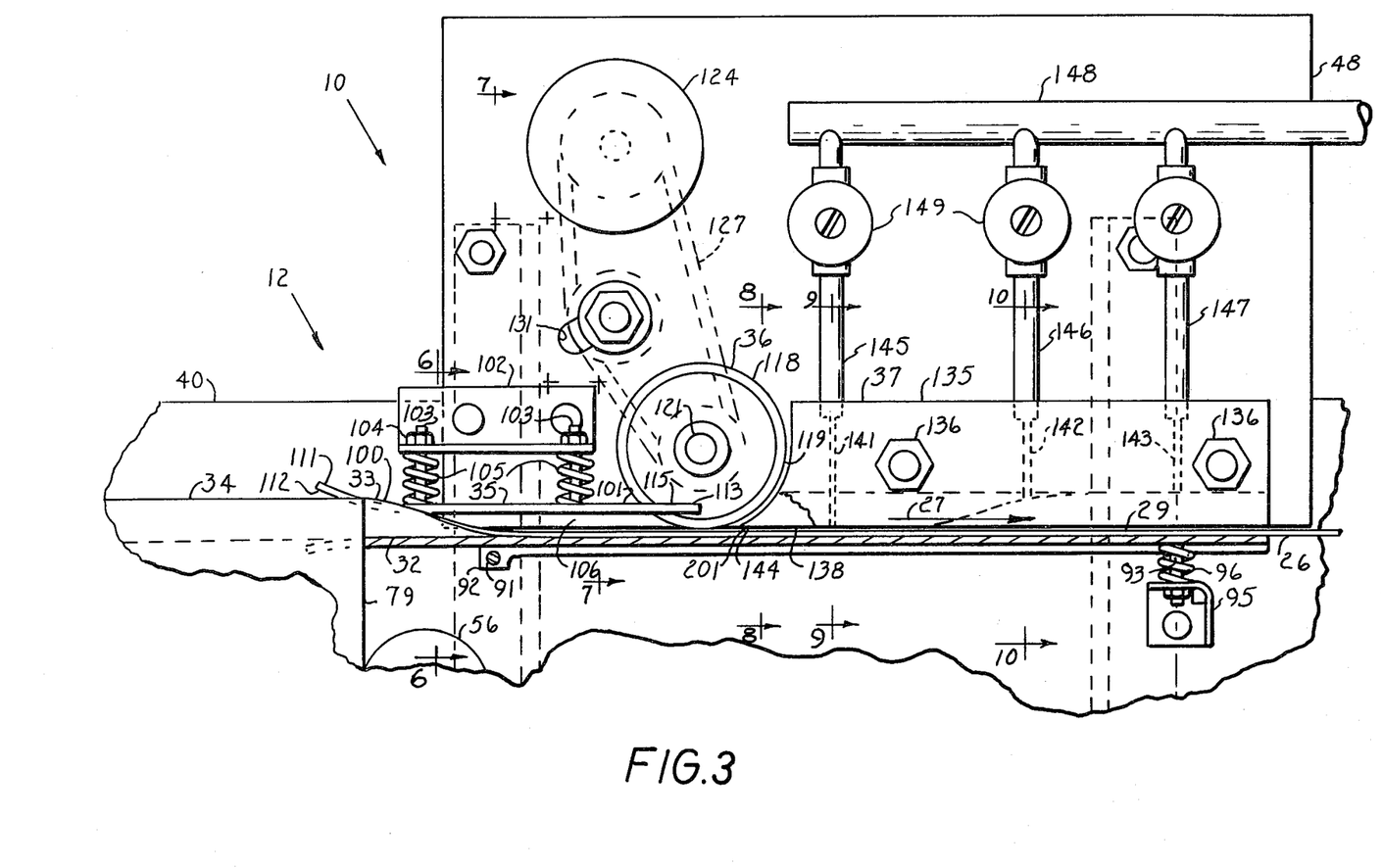
FIG. 3 is a side elevational view taken generally along the Lines 3—3 of FIG. 2.

The shoe 101 has opposite lateral side portions 108 and 109 that overly the opposite side marginal portions 80 and 81 of the belt flight 32 and the shoe also has an intermediate portion 110 that overlies the center portion of the belt 32. At the discharge end 100 of trough 33, the lateral side portions 108 and 109 bear against the opposite marginal portion 80 and 81 of the belt flight and tend to flatten the belt as it pays off from the support elements 78 and 79 at the receiving station 34. The toe portion 111 of the show 101 is a narrow upturned extension of the intermediate portion 110 at the feed end 112 of the shoe. This toe 111 projects into the discharge end 100 of the trough 33 formed by the belt at the receiving station 34 and is thereat spaced apart from the center portion 84 of the top flight 32 of the belt at the bottom of the trough 33. This arrangement provides an entranceway to accomodate reception of the curled shrimp body parts into the space 106 between the belt and shoe 101 during the normal operation of the apparatus. In the space 106, the shrimp body parts are subjected to downward straightening compressive forces exerted by the spring biased shoe 101. The biasing components 105, of course, resistably yield to upward movements of the shoe 101 in response to the forces encountered in pressing the body parts against the center part of the belt 29. As seen in FIGS. 2 and 3, the heel portion 113 of shoe 101 is offset from the toe portion toward the discharge end 77 of the belt flight 32 and is bifurcated to provide an elongated slot 114 that overlies the center portion 84 of the belt flight 32 and accomodates the location of the knife of the cutting mechanism 36.

Figure 7:
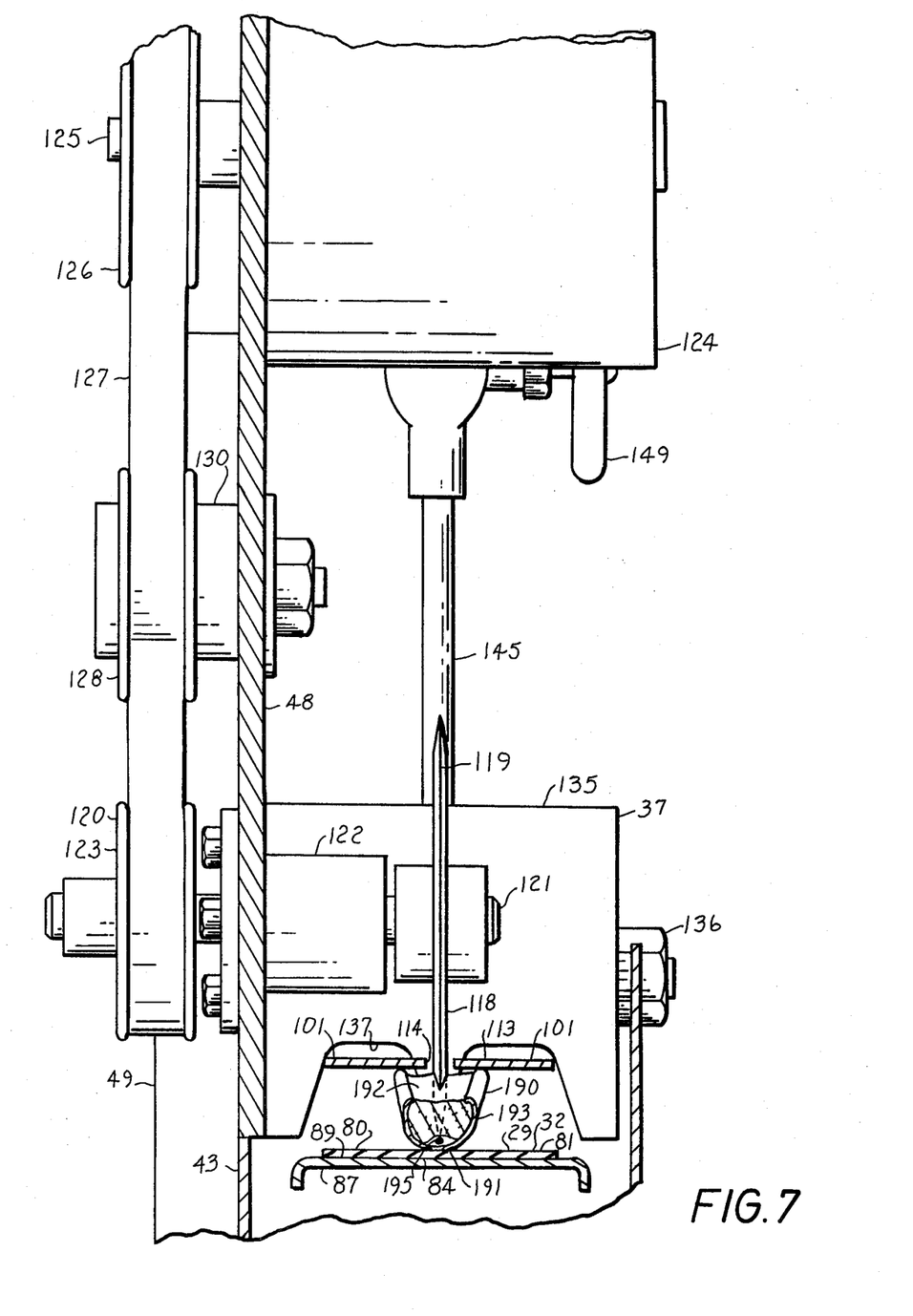
FIG. 7 is a transverse vertical sectional view at the entranceway to the cutting mechanism and as taken generally along the Lines 7—7 of FIG. 3.

The cutting mechanism 36 provides a means for cutting incisions in the shrimp body parts that are straightened by the uncurling device 35 and includes a circular cutting disk or knife blade 118 which is equipped with a circular cutting edge 119 along its periphery, and a mechanism 120 for continuously rotatably driving the knife blade 118. The knife blade 118 is fixed to and mounted for rotation on one end of a shaft 121 that is journaled in a bearing 122 which is in turn mounted in the mounting plate 48 of frame 40 (see FIG. 7). The shaft 121 is equipped at its other end with a sheave 123. The drive mechanism 120 for rotatably driving the knife blade 118 includes an electric motor 124 that is mounted above the knife blade on the mounting plate 48 of frame 40. This motor 124 is provided with a drive shaft 125 that extends through the mounting plate 48 and is equipped with a sheave 126 at the left side of the plate 48. The knife 118 is drivingly connected to the motor 124 by means of a belt 127 which is trained over the sheaves 123 and 126 as seen in FIGS. 3 and 7. Belt 127 is tensioned by means of an adjustable idler pulley 128 that engages the belt 127 and is rotatably mounted on a shaft which is journaled in a bearing 130 that is adjustably mounted in a slot 131 on the mounting plate 48 so as to facilitate an adjustment of the belt tension as the needs arise. The rotatable knife blade 118 provides a means for cutting the shrimp body parts along their ventral sides so as to provide an incision that extends to the digestive tract at the dorsal sides of the body parts as will be more apparent subsequently.

The digestive tract removing device 37 is provided for removing the digestive tract of the shrimp body part through the incision made in the ventral side of the body part by the cutting mechanism 36. The device 37 includes a preformed block 135 that overlies the belt 29 at the discharge end 77 of the belt flight 32. The block 135 is fixed to the side mounting plate 48 of frame 40 by means of bolts 136. It has a bottom groove 137 with an elongated centrally located depending narrow V-shaped rib 138 that has a lower side edge 139. The rib 138 in the block 135 is located in working alignment with the knife blade 118 so that it enters the incision in the shrimp body part as it leaves the cutting mechanism and is carried from the blade toward the discharge end 77 of the belt flight 32. The rib 138 overlies the center portion 84 of the belt flight 32 and although upwardly spaced apart from the center portion 84, is nevertheless located in close proximity thereto at the feed end 144 of the block so that the lower side edge 139 of the rib enters the base of the incision at the discharge side 140 of the knife blade 118 as it leaves the knife blade.

The block 135 has three vertical passages 141, 142 and 143 for projecting water into and around the body part as it passes through the bottom groove 137. The bottom edge 139 of the rib broadens and progressively rises above the belt along the path traversed by the shrimp parts. At the feed end 144 of the block 135, the first passage 141 opens downwardly through the lower side edge 139 so that the water that issues from the passage 141 projects into the base of the incision and flushes the digestive tract from the incision. The three passages 141, 142 and 143 are aligned along the path 27. The water issuing from passage 141 primarily separates the tract from the body part and flushes it from the incision and the other two passages, 142 and 143, mainly serve to remove the debris from the inside body part and top flight of the belt so that the debris and wash water collect at the sump 90 area of the tray 41.

As seen in FIGS. 3 and 7, the passages 141, 142 and 143 communicate with respective water lines 145, 146 and 147 which are in turn connected to a header 148. Header 148 is suitably connected to a source of water and each water line is provided with a valve 149 that is hand manipulatable to regulate the flow of water through the passages 141, 142 and 143.

In the product orienting section 11, the shrimp body parts are oriented by a mechanism 19 that serves to automatically orient the shell bearing shrimp body parts so that they are restingly supported on their backs or dorsal sides and to thereafter successively discharge the body parts into the trough 33 of the processing section 12. Mechanism 19 includes a pair of elongated narrow inclined cylindrical rolls 20 and 21 heretofore referred to, and a roll drive mechanism 22 which as will be subsequently seen, is provided for rotatably driving the rolls in opposite directions. These rolls 20 and 21 are arranged in parallel and are closely and laterally spaced apart in an arrangement such that they decline in parallel toward the receiving station 34 at the feed end 30 of the conveyor 26. As thus arranged, the rolls 20 and 21 define an inclined channel 153 in which the shrimp body parts are received and supported on the rolls as they are being oriented. The rolls 20 and 21 are mounted on parallel shafts 154 and 155 that are journaled at the lower end 157 of the roll assembly 158 in suitable bearings (not shown) which are mounted on a bracket 156 that is fixed to the left side wall 43 of tray 41. At the upper end 159 of the roll assembly 158, the shafts 154 and 155 are journaled in suitable bearings (not shown) that are mounted in a mounting plate 160 which is fixed relative to the tray 41 by means not shown. At the lower end of the mounting plate 160, a U-shaped bracket 161 is welded to the mounting plate to provide a mounting plate for the electric motor 162 of the roll drive mechanism 22.

Figure 13:
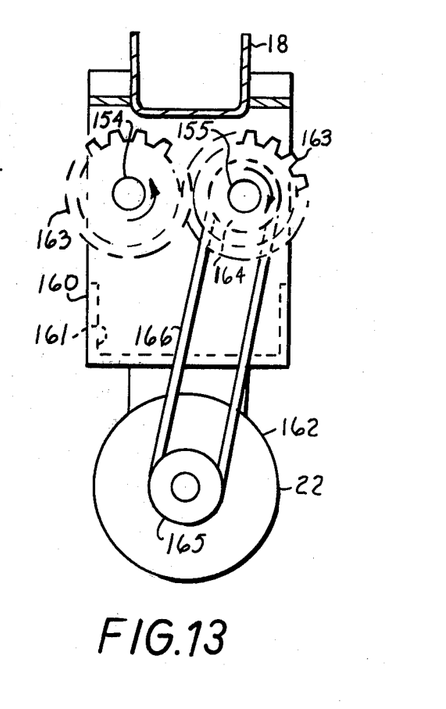
FIG. 13 is a view showing the drive mechanism for the rolls as seen generally along the Lines 13—13 of FIG. 1.

The shafts 154 and 155 carry meshing gears 163 at the upper end of the assembly 158 and shaft 155 also carries a sheave 164 that is drivingly connected to the motor sheave 165 by means of a belt 166 that is shown in FIG. 13. This enables the rolls to be rotatably driven in opposite directions which as will be subsequently seen provide for the upward passage of the cylindrical roll surfaces 168 and 169 at the space 172 between the cylindrical rolls.

The smooth cylindrical surfaces 168 and 169 of the rolls 20 and 21 are discontinuous and provided with a pair of elongated grooves 170 that are angularly spaced apart by 180° on each roll. These grooves 170 in the cylindrical surfaces are arranged in parallel with the rotational axes 171 for the rolls and the grooves on each roll are so-arranged as to confront a portion 173 (see FIG. 11) of a smooth cylindrical surface of the other roll at the space 172 between the rolls during each revolution thereof.

Figure 11:
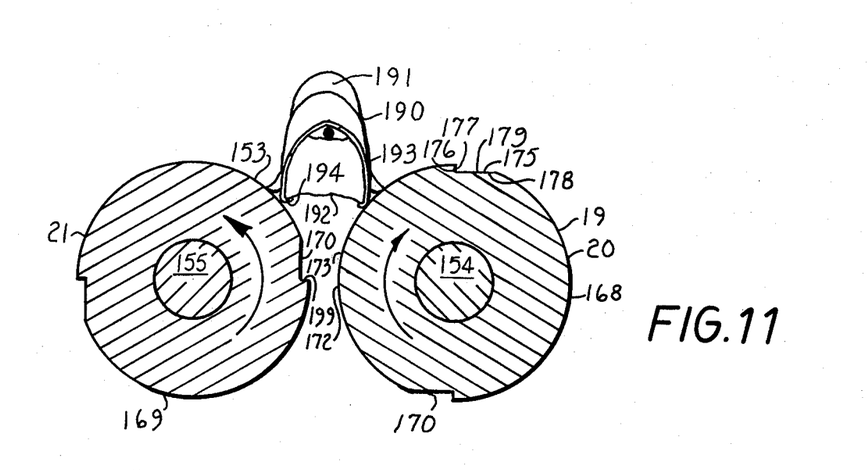
FIG. 11 is a transverse sectional view through the rolls as taken generally along the Lines 11—11 of FIG. 1.
Figure 12:
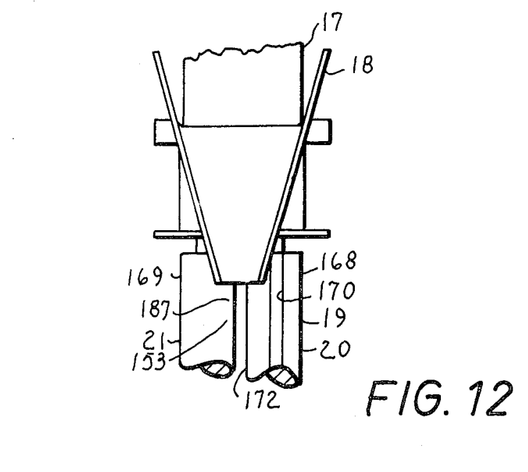
FIG. 12 is a view at the feed end of the rolls as taken generally along the Lines 12—12 of FIG. 1.

As will be seen in FIG. 11, the grooves 170 in the cylindrical surfaces 168 and 169 are somewhat V-shaped in cross section. As seen by reference to the groove designated at 175 in roll 20 (FIG. 11), the trailing side 176 of each groove is defined by an elongated narrow ledge forming surface 177 that generally projects radially inwardly of the smooth cylindrical surface 168 of the roll 20. On the other hand, the leading side 178 of each groove is defined by an elongated narrow surface 179 which projects inwardly of the cylindrical surface 168 at a small acute angle that in the preferred practice is less than 45° with a tangential plane at the intersect of the narrow surface 179 and cylindrical surface 168. As indicated before, the ledge forming surface at each groove in the roll assembly is so-arranged that during each revolution it becomes oriented at the space 172 between the rolls opposite a portion of the smooth cylindrical surface of the other roll. In other words, the drive arrangement for the rolls and the location of the grooves in the cylindrical surfaces are such that the grooves in the respective rolls never confront one another at the space between the rolls. As will be seen, this enables the ledges 177 in the rolls to encounter the shells of the shrimp body parts that are supported on the rolls with their ventral sides confronting the space 172 between the rolls and to flip the body parts over onto their back or dorsal sides in the channel 153.

The mounting plate 160 for the roll shafts is provided with a cutout at its upper end and in which the chute 18 is mounted as seen in the drawings. The conveyor 17 for feeding the product to the orienting mechanism includes an endless belt 183 that is trained over suitable rolls including a drive roll designated at 184 and which is driven in the direction of the arrows shown in FIG. 1. The conveyor randomly discharges the curled shrimp body parts to be processed into the chute 18 and from which they fall into the upper feed end 187 of the channel 153 for orientation and subsequent discharge at the lower end 188 of the channel into the receiving station 34 of the product processing section 12. At the discharge end 38 of the conveyor 26 in the processing section 12, the end wall 46 of tray 41 has a cutout. Here, the apparatus 10 is equipped with a chute 186 for receiving and guiding the processed product from the conveyor and into the receptacle 13.

Figures 14, 15:
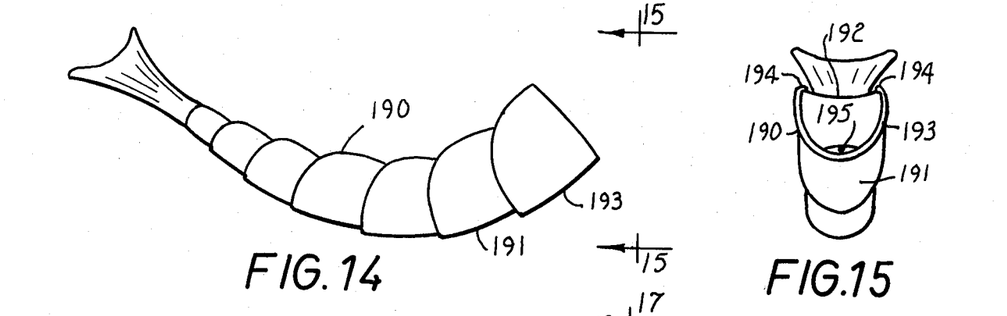
FIG. 14 is a side view of a shell bearing curled shrimp body part with the head and legs removed.
FIG. 15 is a view of the body part shown in FIG. 14 as taken generally along the Lines 15—15 therein.

Before discussing the operation of the apparatus 10, reference is made to FIGS. 14–17. FIG. 14 illustrates in side view an uncooked shell bearing curled shrimp body part 190 from which the head and legs have been removed. As seen in FIG. 14, the body part 190 is resting on its back or dorsal side 191 and the ventral side 192 is facing upwardly. This is the position into which the body parts are oriented by mechanism 19 and in which the body parts are delivered to and supported in the trough 33 at the receiving station 34. The shell 193 of the body part 190 is generally U-shaped in cross section as seen in FIG. 15 and at the ventral side 192 of the body part, the shell 193 terminates at its opposite sides along lower side edges 194. As will be subsequently seen, it is these side edges 194 of the shell 193 which are encountered by the roll ledges 177 during the orientation of the body parts by mechanism 19. FIG. 15 also shows that the digestive tract 195 is located along the dorsal side 191 of the body part and is located in close proximity to the shell 193 thereat.

Figure 16:
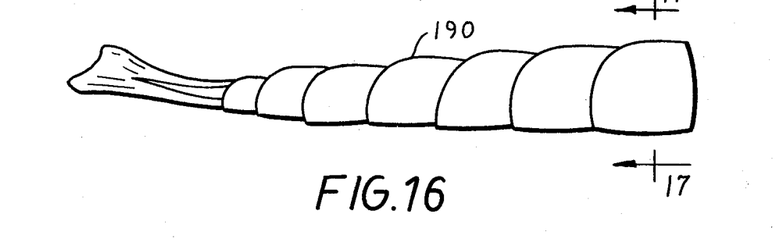
FIG. 16 is a side view of the body part shown in FIG. 14 as seen in a straightened position.
Figure 17:
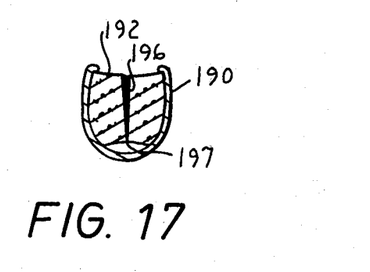
FIG. 17 is a cross sectional view of the body part shown in FIG. 16 as seen along the Lines 17—17 therein.

FIG. 16 shows the body part 190 in the straightened or uncurled position it assumes during passage through the cutting mechanism 36 and as it passes from beneath the block 135 at the discharge end 38 of the conveyor before recovering a part of the curl illustrated in FIG. 14. FIG. 17 is a cross section that illustrates the incision 196 that is made along the ventral side 192 of the body part for removal of the digestive tract 195 seen in FIG. 15. The illustration in FIG. 17 depicts the body part with the tract removed and illustrates the depth of penetration required in making the incision 196 in order to remove the digestive tract from the incision and through the ventral side of the body part.

The operation of the apparatus 10 is continuous and automatic, and with all of the drive mechanisms energized and in operation, the shrimp body parts to be processed are delivered to the feed end 187 of the channel 153 formed by the rolls 20 and 21 by means of the conveyor 17 and chute 18. At its lower end (not shown), the conveyor 17 picks up the individual body parts on the belt 183 and continuously delivers the curled parts to the chute 18. Here, the body parts are continuously discharged randomly and fall into the top or feed end 187 of the channel 153 formed by the rolls 20 and 21. The curled body parts received in the channel 153 are supported by the rolls 20 and 21 while being oriented and throughout their passage to the discharge end of the mechanism 19. The body parts are randomly arranged upon reception in the channel 153 and thereafter, the roll movement serves to orient the body parts into a parallel alignment with the rolls, i.e. with the elongated curled body parts generally overlying the elongated narrow space 172 between the rolls. This initial orientation takes place because of the more or less V-shaped nature of the channel 153 and the roll movement that tends to align the body parts in a successive descending arrangement and movement toward the discharge end 188 of the channel.

Since the processing section 12 is designed to process shrimp that are received at the receiving station 34 with their ventral sides facing upwardly, the mechanism 19 is also designed to flip those body parts in the channel 153 which are arranged with their ventral sides facing downwardly (see FIG. 11) over onto their back or dorsal side.

FIG. 11 shows the curled body part 190 illustrated in FIG. 14 as restingly supported on the rolls 20 and 21 with its ventral side 192 confronting the space 172 between the rolls 20 and 21. As thus supported and shown in FIG. 11, ledge 199 of roll 21 is about to encounter the adjacent lower side edge 194 of the shell 193. When this happens, the body part 190 will be flipped over into a resting position at which it is supported on its dorsal side 191 between the rolls. Once supported on its dorsal side 191 between the rolls, the position of the body part 190 becomes stabilized and further encounter with the groove side defining surfaces is not disruptive of the supported position.

In a preferred arrangement for handling uncooked rock shrimp body parts with a maximum diameter across the body part that ranges from about ¾" to 1", the diameter of each roll is 2", the spacing between the rolls is about ¼", the width of the radially projecting trailing side walls of the V-shaped grooves is 1/16", the width of the leading side walls is ¼", and the roll speed may vary from about 20–120 rpm under normal operating conditions. The higher roll speeds may be used to increase the throughput of the orienting mechanism.

Operationally, the shrimp body part is flipped over on its back or dorsal side by an encounter between the ledge and the adjacent lower side edge of the shell. As such, the speed of the rolls should be sufficient to accomplish this objective and this speed may be readily determined by trial and error.

The rotational movement of the rolls 20 and 21 also causes the shrimp body parts to move downwardly along the channel 153. At the discharge end 188 of the channel 153 the body parts fall into the trough 33 formed by belt 29 at the receiving station 34. As the uncooked shrimp body parts fall successively into the trough 33, they assume positions at which the dorsal sides face downwardly in the trough 33 and, as such, are restingly supported in the belt trough formation 33 as thus supported in the roll channel formation 153.

The path 27 of movement through the uncurling device 35, cutting mechanism 36, and digestive tract removing device 37 is linear and the product movement is also continuous. As the body part received in the trough 33 advances along the path 27, it enters the uncurling device 35 at the discharge end 100 of the trough. Here, the leading end of the body part passes beneath the toe 111 of the shoe 101 and into the space 106. As this happens, the body part is pressed by the shoe under the urgings of the springs against the belt 29 and all while the body part remains supported on its dorsal side. As the leading end of the body part advances beneath the shoe, the trough formation tends to dissipate as the marginal portions 80 and 81 of the belt around the leading end of the body part engage the lateral side portions 108 and 109 at the toe end of the shoe. As such, the belt tends to flatten at the toe end of the shoe and the pressure exerted by the shoe against the leading end of the body part as it becomes trapped in the space 106, draws the trailing end of the body part beneath the shoe and into the space 106 as the belt further advances along the path. The pressure exerted by the shoe against the curled body part in space 106 causes the body part to uncurl and become straightened out while nevertheless retaining its supported position on its dorsal side and in contact with the center portion of the belt.

Figure 8:
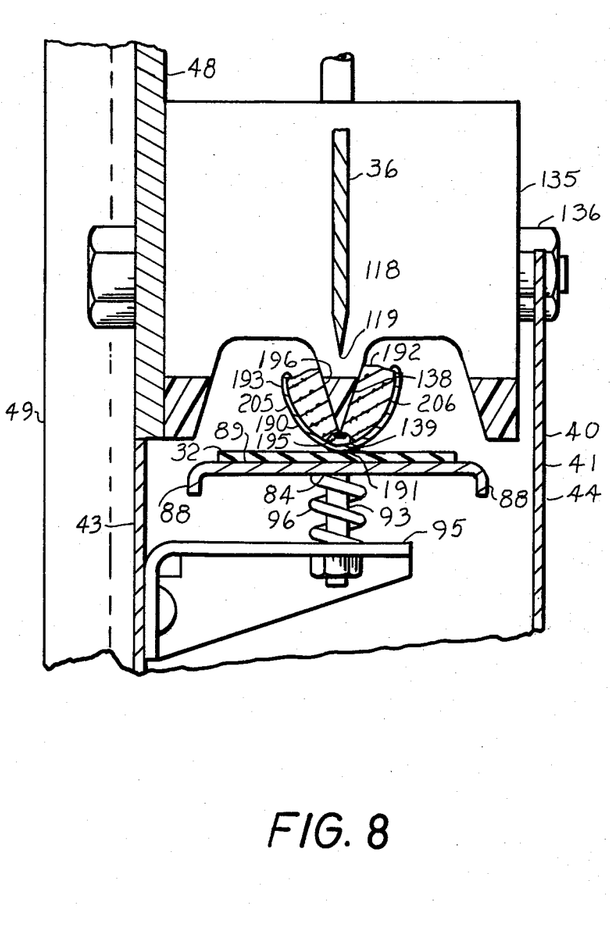
FIG. 8 is a transverse vertical section view taken generally along the Lines 8—8 of FIG. 3.

As the straightened body part leaves the discharge end 115 of the uncurling device 35, it encounters the rotating knife blade 118 of mechanism 36, as seen in FIG. 7. Here, the rear end or heel portion 113 of the shoe 101 is bifurcated to accomodate the location of the knife blade 118, as previously indicated. This arrangement permits the heel 113 of the shoe 101 to maintain the dorsal side 191 of the shrimp body part 190 in contact with the belt 29 as it is being cut into sections 205 and 206 along the ventral side 192 by the knife blade 118, as exemplified by reference to the body part seen in FIGS. 7 and 8. The incision 196 in the body part 190 is deep enough to penetrate to the digestive tract 195 at the dorsal side 191 of the body part 190, and as such, may be considered as severing the body part into two sections 205 and 206 and which are interconnected along the dorsal side 191 by the shell 193.

Figure 9:
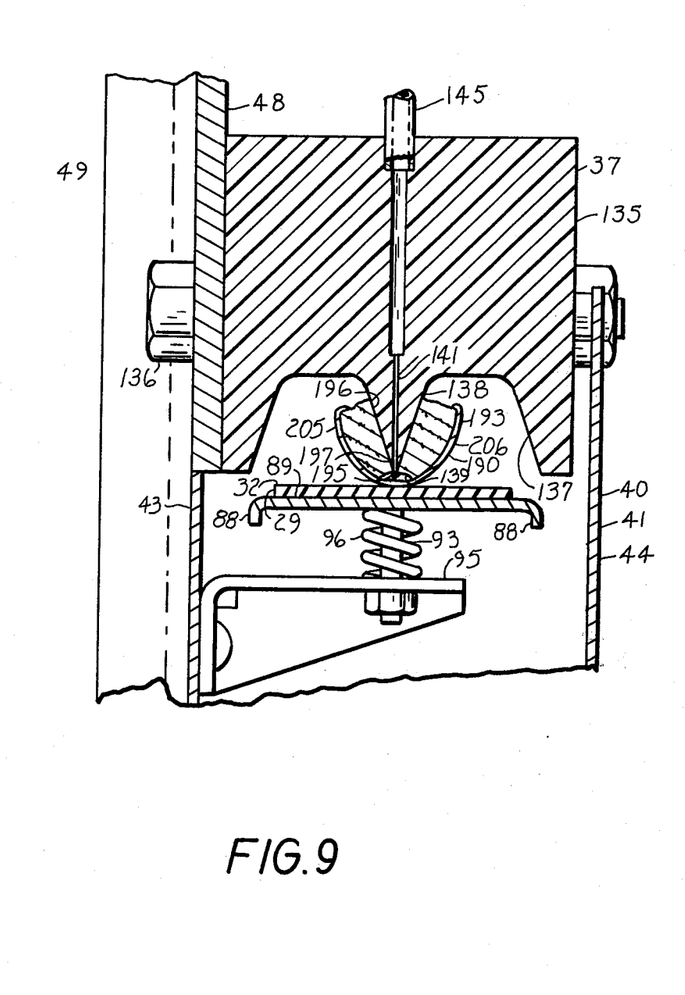
FIG. 9 is a transverse vertical sectional view taken generally along the Lines 9—9 of FIG. 3.
Figure 10:
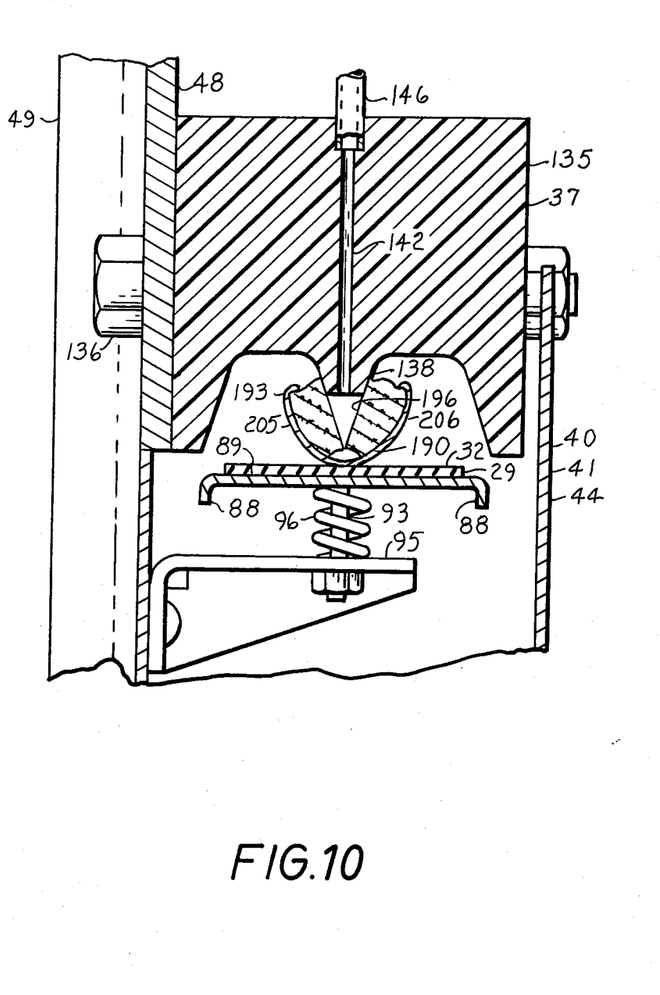
FIG. 10 is a transverse vertical sectional view taken generally along the Lines 10—10 of FIG. 3.

As the leading end of the body part 190 leaves the cutting station (FIG. 8), the front end 201 of the rib 138 enters the incision 196 made by the knife blade and passes between the body sections 205 and 206. As the body part advances further along the path 27, the rib 138 continues to enter the incision and exposes the digestive tract 195 to the action of the water jet that issues from passage 141 (see FIG. 9). The water jet from passage 141 issues from the lower side edge 139 of the rib and into the base 197 of the incision 196, as previously indicated. For all intents and purposes, this water jet from passage 141 serves to disconnect the digestive tract 195 from the remainder of the body part 190 and to flush the digestive tract 195 out of the incision 196. Thereafter as the water jets from passages 142 and 143 are encountered with further movement of the body part along the path 27 toward the discharge end 38 of the conveyor, the remaining debris in and about the body part on the belt is flushed into the sump at the bottom of the tray 41. This debris and used wash water are thereafter carried to disposal by means of a drain pipe 203 located at the bottom of the tray 41.

As the body part leaves the area between the block and the belt, they pass from the discharge end 77 of the top flight onto the chute 186 and from there to the receptacle 13.

From the foregoing disclosure it is evident that although the eviscerating apparatus is especially designed for the handling of uncooked rock shrimp body parts, that the various aspects of the invention may also be employed for the handling of other types of shrimp. As far as the orienting mechanism is concerned, the applicant has set forth a preferred embodiment in which each roll is equipped with a pair of ledges so as to rapidly orient and flip the body parts into positions at which they are resting on their dorsal sides. In practice, when the number of ledges in the roll assembly are reduced the length of the rolls must be increased for a constant feed rate to accomplish the same job. In its simplest form, only one ledge is required in the roll assembly however.

While only one preferred embodiment of this invention has been shown and described by way of illustration, many modifications will occur to those skilled in the art and it is, therefore, desired that it be understood that it is intended herein to cover all such modifications that fall within the true spirit and scope of this invention.

What is claimed as new and what it is desired to secure by Letters Patent of the United States is:

1. A mechanism for orienting shell bearing curled shrimp body parts and for successively discharging the oriented body parts therefrom comprising a pair of elongated inclined cylindrical rolls that are laterally spaced apart and arranged in parallel to define a channel in which the body parts are received and supported during the orientation thereof, said channel being inclined and having an upper end at which the body parts are received, and a lower end from which the body parts are discharged, each of said cylindrical rolls having a smooth cylindrical surface, means for rotatably driving said rolls in opposite directions that provide for the upward passage of the cylindrical surfaces thereof at the space between said rolls, means for feeding randomly arranged shell bearing curled shrimp body parts into the channel at said upper end, at least one of said cylindrical rolls having an elongated narrow groove in its cylindrical surface; said elongated groove being arranged in parallel with the axis of rotation of said one roll and during each revolution thereof to facially confront at the space between the rolls a portion of the smooth cylindrical surface of the other of said rolls, said one roll having a ledge forming surface that projects generally radially inwardly of the smooth cylindrical surface thereof and defines the trailing side of said groove; said ledge being arranged when said rolls are being driven to encounter the lower side edge of the shell of a shrimp body part that is supported on the rolls with its ventral side confronting said space therebetween and to flip the encountered body part over onto its dorsal side in the channel defined by said rolls.

2. A mechanism for orienting shell bearing curled shrimp body parts and for successively discharging the oriented body parts therefrom in accord with claim 1 wherein said elongated narrow groove is generally V-shaped in cross section, and said one roll has another surface that defines the leading side of said groove and projects inwardly of the smooth cylindrical surface thereof at a small acute angle of less than 45° therewith.

3. An eviscerating apparatus for processing shell bearing curled shrimp body parts comprising a conveyor for carrying the body parts along a linear path having a receiving end and a discharge end, said conveyor having an endless flat belt with a flight that extends along said linear path for supporting the body parts therealong, and means for continuously driving the belt, shaping means at the receiving end of said path for thereat shaping the belt flight into a narrow trough for receiving and supporting the body parts, means for orienting the shell bearing curled shrimp body parts so that they are restingly supported on their dorsal sides and for successively delivering the thus oriented body parts to said trough, said belt flight having opposite side marginal portions and a center portion therebetween, uncurling means for straightening the curled body parts delivered to said trough, said uncurling means including belt supporting means with a flat upwardly facing belt bearing surface which is located between said discharge end and said shaping means and thereat underlies and supports the belt flight, and a shoe which overlies the belt flight and the belt supporting means for forcefully pressing an oriented curled body part delivered to the trough against the center portion of said belt flight, said shoe having opposite lateral side portions which overlie and respectively bear against the opposite side marginal portions of the belt flight at the end of the trough adjacent said shoe, and an intermediate portion which is located between said lateral side portions and which overlies and is spaced apart from the center portion of the belt flight at said adjacent end of the trough to accomodate reception of an oriented and curled body part delivered to said trough in the space between said center portion and said intermediate portion at said adjacent end of said trough.

4. An eviscerating apparatus for processing shell bearing curled shrimp body parts in accord with claim 3 wherein the shaping means includes means underlying and supporting the opposite side marginal portions above the center portion of the belt flight at said receiving end of said linear path.

5. An eviscerating apparatus for processing shell bearing curled shrimp body parts in accord with claim 3 wherein the shaping means includes a grooved roll over which the belt is trained at said receiving end of said linear path.

6. An eviscerating apparatus for processing shell bearing curled shrimp body parts in accord with claim 3 wherein said shoe has a toe portion which extends into the trough at the trough end adjacent said shoe and overlies the center portion of the belt flight thereat, said toe portion constituting an extension of said intermediate portion of said shoe.

7. An eviscerating apparatus for processing shell bearing curled shrimp body parts in accord with claim 3 wherein said trough has a discharge end, said shoe has a toe portion located adjacent the discharge end of said trough, and an operating position at which said toe portion is upwardly spaced apart from the center portion of said belt flight, and said apparatus further comprises means biasing the shoe downwardly into said operating position and being yieldably resistive to upward movement of the shoe in response to forces encountered thereby during the forceful pressing of an oriented curled body part against the center portion of the belt flight.

8. An eviscerating apparatus for processing shell bearing curled shrimp body parts comprising a conveyor for carrying the body parts along a linear path having a receiving end and a discharge end, said conveyor having an endless flat belt with a flight that extends along said linear path for supporting the body parts therealong, and means for continuously driving the belt, shaping means at the receiving end of said path for thereat shaping the belt flight into a narrow trough for receiving and supporting the body parts, means for orienting the shell bearing curled shrimp body parts so that they are restingly supported on their dorsal sides and for successively delivering the thus oriented body parts to said trough, said belt flight having opposite side marginal portions and a center portion therebetween, uncurling means for straightening the curled body parts delivered to said trough, said uncurling means including belt supporting means with a flat upwardly facing belt bearing surface which is located between said discharge end and said shaping means and thereat underlies and supports the belt flight, and a shoe which overlies the belt flight and said belt supporting means for forcefully pressing an oriented curled body part delivered to the trough against the center portion of said belt flight, said trough having a discharge end, said shoe having opposite lateral side portions which overlie and respectively bear against the opposite side marginal portions of the belt flight at the discharge end of the trough, and an intermediate portion which is located between the opposite lateral side portions and which overlies and is spaced apart from the center portion of the belt flight at the discharge end of the trough to accomodate reception of an oriented and curled body part delivered to said trough in the space between said center portion and said intermediate portion at the discharge end of the trough, said shaping means including a grooved roll over which the belt is trained at the receiving end of said linear path, and means underlying and supporting the opposite side marginal portions above the center portion of the belt flight at the receiving end of said linear path, said shoe further having a toe portion which extends into the trough at the discharge end thereof and overlies the center portion of the belt flight thereat, and an operating position at which said toe portion is upwardly spaced apart from the center portion of said belt flight, said toe portion constituting an extension of said intermediate portion of the shoe, and said apparatus further comprising means biasing the shoe downwardly into said operating position and being yieldably resistive to upward movement of the shoe in response to forces encountered thereby during the forceful pressing of an oriented curled body part against the center portion of the belt flight.

9. An eviscerating apparatus for processing shell bearing curled shrimp body parts comprising a conveyor for carrying the body parts along a linear path having a receiving end and a discharge end, said conveyor having an endless flat belt with a flight that extends along said linear path for supporting the body parts therealong, and means for continuously driving the belt, shaping means at the receiving end of said path for thereat shaping the belt flight into a narrow trough for receiving and supporting the body parts, said trough having a discharge end, means for orienting the shell bearing curled shrimp body parts so that they are restingly supported on their dorsal sides and for successively delivering the thus oriented body parts to said trough, said belt flight having opposite side marginal portions and a center portion therebetween, uncurling means for straightening the curled body parts delivered to said trough, said uncurling means including a shoe which overlies the belt flight at the discharge end of the trough for forcefully pressing an oriented curled body part delivered to the trough against the center portion of said belt flight, said shoe having a toe portion which extends into the trough at the discharge end thereof and overlies the center portion of the belt flight thereat, and a bifurcated heel portion with an elongated slot that overlies the center portion of the belt flight, said toe portion being spaced apart from the center portion of the belt flight at the discharge end of the trough to accomodate reception of an oriented and curled body part delivered to said trough in the space between said center portion of the belt flight and said toe portion, and said apparatus further comprising a rotatable knife blade extending through said elongated slot for cutting a straightened shrimp body part being pressed against the belt flight by said shoe along the ventral side of the body part and to provide an incision therein that extends to the digestive tract at the dorsal side of the staightened body part.

10. An eviscerating apparatus for processing shell bearing curled shrimp body parts in accord with claim 9 further comprising means overlying the belt flight between the discharge end of the linear path and said rotatable knife for removing the digestive tract of the cut body part through the incision therein.

11. An eviscerating apparatus for processing shell bearing curled shrimp body parts in accord with claim 10 wherein said digestive tract removing means includes rib means upwardly spaced apart from and overlying the center portion of the belt flight in working alignment with said knife blade for entering the incision in the cut body part as it is carried from the knife blade toward the discharge end of the linear path, said rib means having a lower side edge that is located at the base of the incision when the rib means is located therein, and at least one water passage opening downwardly of the rib means at said lower side edge for projecting water into the base of the incision to thereby flush the digestive tract of the cut body part from the incision.

12. In an eviscerating apparatus for processing shell bearing curled shrimp body parts, the improvement comprising a mechanism for automatically orienting the curled shrimp body parts and successively discharging the oriented body parts, a conveyor for receiving and carrying the oriented body parts discharged by the mechanism along a linear path having a receiving end and a discharge end, said conveyor having an endless flat belt with a flight that extends along said linear path for supporting the body parts therealong, and means for continuously driving the belt, and shaping means at the receiving end of said path for thereat shaping the belt flight into a narrow trough for receiving and supporting the oriented body parts discharged by the orienting apparatus.

13. An eviscerating apparatus for processing shell bearing curled shrimp body parts comprising means for orienting the curled body parts so that they are supported on their dorsal sides and for successively discharging the thus oriented curled body parts from the orienting means, a conveyor for receiving and carrying the thus oriented body parts along a linear path, said conveyor having an endless flat belt with a flight for supporting the thus oriented body parts on their dorsal sides along said path, and means for continuously driving the belt, means along the linear path for straightening the thus oriented curled body parts supported by the belt flight, means along the linear path for cutting incisions in the thus oriented and straightened body parts supported by the belt flight, said incisions being in the ventral sides and penetrating to the digestive tracts at the dorsal sides of the cut and straightened body parts, and means along the linear path for removing the digestive tracts of and through the incisions in the cut and straightened body parts.

14. An eviscerating apparatus for processing shell bearing curled shrimp body parts in accord with claim 13 wherein said linear path has a receiving end and a discharge end, and said orienting means includes a pair of elongated inclined cylindrical rolls that are laterally spaced apart and arranged in parallel to define a channel in which randomly arranged shell bearing shrimp body parts are received and supported during the orientation thereof, said channel being inclined and having an upper end at which the randomly arranged body parts are received, and a lower end from which the thus oriented curled body parts are successively discharged, each of said rolls having a smooth cylindrical surface, means for rotatably driving said rolls in opposite directions that provide for the upward passage of the smooth cylindrical surfaces at the space between said rolls, at least one of said rolls having a ledge forming surface that projects inwardly of the smooth cylindrical surface thereof, said ledge being adapted and arranged when said rolls are being driven to encounter curled shrimp body parts that are supported in the channel with their ventral sides facing the space between the rolls and to flip the encountered body parts onto their dorsal sides and thereby thus orient the curled body parts, and said ledge being arranged opposite a portion of the smooth cylindrical surface of the other of said rolls at the space between the rolls during each revolution of said one roll.

15. An eviscerating apparatus for processing shell bearing curled shrimp body parts in accord with claim 14 wherein the apparatus further comprises shaping means at the receiving end of the path for thereat shaping the belt flight into a narrow trough for receiving and supporting the thus oriented curled body parts successively discharged from the orienting means.

16. An eviscerating apparatus for processing shell bearing curled shrimp body parts in accord with claim 15 wherein said trough has a discharge end, said straightening means includes a shoe which overlies the belt flight at the discharge end of said trough for forcefully pressing the thus oriented curled body parts received in the trough against the belt flight.

17. An eviscerating apparatus for processing shell bearing curled shrimp body parts in accord with claim 16 wherein said belt has opposite side marginal portions and a center portion therebetween, said shoe has a toe portion that extends into the discharge end of said trough and overlies and is spaced apart from the center portion of the belt to provide a space between the toe portion and shoe for the reception of the thus oriented curled body parts received in the trough, and a heel portion that is offset from the toe portion toward the discharge end of the linear path, said heel portion having an elongated slot that overlies the center portion of said belt, and said cutting means including a circular knife blade located in said slot for cutting said incisions.

18. An eviscerating apparatus for processing shell bearing curled shrimp body parts in accord with claim 13 wherein said removing means includes rib means upwardly spaced apart from and overlying the center portion of the belt flight in working alignment with the knife blade for entering the incisions in the thus oriented and straightened body parts cut by said cutting means, said rib means having a lower side edge that is located at the base of the incision when the rib means is received therein, and at least one water passage opening downwardly of the rib means at said lower side edge for projecting water into the base of the incision to thereby flush the digestive tract of the cut body part from the incision.

19. An eviscerating apparatus for processing shell bearing curled shrimp body parts in accord with claim 17 wherein said removing means includes rib means upwardly spaced apart from and overlying the center portion of the belt flight in working alignment with the knife blade for entering the incisions in the thus oriented and straightened body parts cut by said cutting means, said rib means having a lower side edge that is located at the base of the incision when the rib means is received therein, and at least one water passage opening downwardly of the rib means at said lower side edge for projecting water into the base of the incision to thereby flush the digestive tract of the cut body part from the incision.

* * * * *